J. E. TAGGART.
SHIELD FOR COOKING UTENSILS.
APPLICATION FILED SEPT. 29, 1913.
1,096,204.
Patented May 12, 1914.
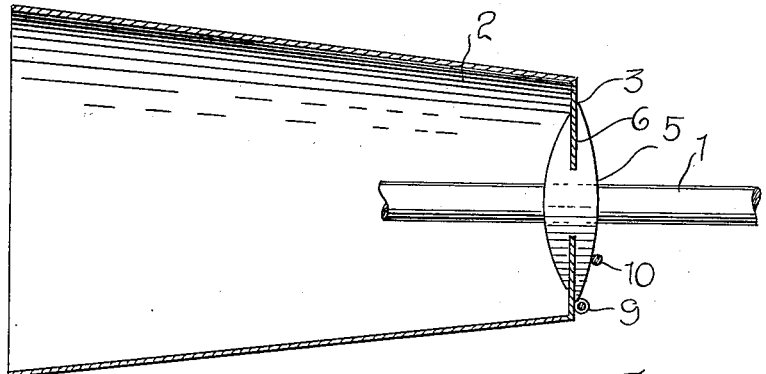
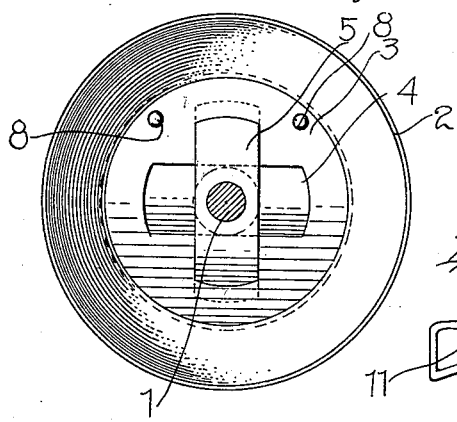
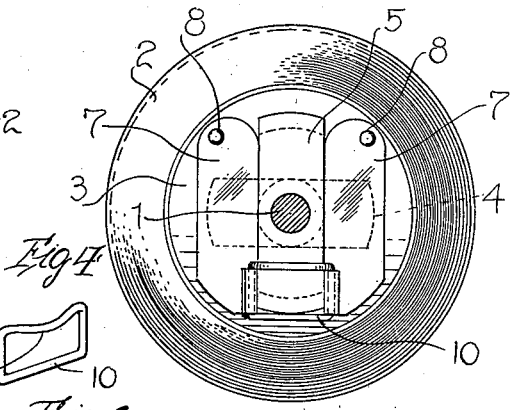
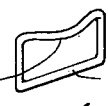
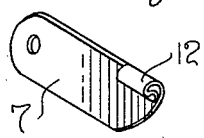
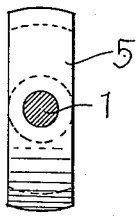
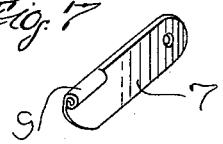
Inventor
JAMES E. TAGGART
Witnesses
Robert M. Sytphew
V. J. Dowrick
By Watson E. Coleman
Attorney

UNITED STATES PATENT OFFICE.

JAMES E. TAGGART, OF HOUSTON, TEXAS.

SHIELD FOR COOKING UTENSILS.

1,096,204.  Specification of Letters Patent.  Patented May 12, 1914.

Application filed September 29, 1913. Serial No. 792,494.

*To all whom it may concern:*

Be it known that I, JAMES E. TAGGART, a citizen of the United States, residing at Houston, in the county of Harris and State of Texas, have invented certain new and useful Improvements in Shields for Cooking Utensils, of which the following is a specification, reference being had to the accompanying drawings.

This invention relates to new and useful improvements in shields for cooking utensils and more particularly to a protector for the hand and arm of a cook applicable to the handle of the utensil and the primary object of the invention is to provide a device of this character which may be quickly and readily attached to any device now in use.

A further object of the invention resides in providing improved means for securing the shield to the shank or handle of the utensil and a still further object resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawing forming a part of this application, Figure 1 is a longitudinal section through the shield applied to use. Fig. 2 is an end elevation showing the shank of the utensil in section. Fig. 3 is an opposite end elevation of the same also showing the shank of the utensil in section. Fig. 4 is a perspective view of one of the clips which hold the locking plates together. Fig. 5 is a perspective view of one of the locking plates. Fig. 6 is a section through the shank of the tool showing the stop member thereon; and Fig. 7 is a perspective view of an additional locking plate used on the device.

In describing my invention, I shall refer to the drawing in which similar reference characters designate corresponding parts throughout the several views and in which—

1 indicates the shank of a frying or cooking utensil, such as a fork, spoon or turner and my invention contemplates the provision of a device on this shank or handle to protect the hand and arm of the cook using the utensil. To this end, I provide a frusto-conical member 2 formed preferably of metal, the larger end of which is open and the smaller end of which is provided with a wall or closure 3 having a slot or elongated opening 4 therein.

Formed on the shank 1 is a stop member 5 of elongated design, said stop member being slotted from its ends, as shown at 6 and having the front section of slightly greater length than the rear section. The smaller or rear section of the stop member 5 is of such size as to be readily introduced through the opening 4, while the front or longer section 5 is of slightly greater length than said opening or slot 4 in the end wall 3 of the shield 2. This stop member has the front and rear faces thereof designed convexly from end to end, as clearly shown in Fig. 1 of the drawing.

The stop member 5 on the shank 1 is arranged intermediate the ends of the latter and in applying the member 2 to said shank, the outer end of said shank is introduced through the opening or slot 4 in the end wall 3 of the shield and the smaller section of the stop member 5 also introduced through said opening. The shank 1 is then turned so as to receive portions of the wall 3 on each side of the opening 4 in the slotted portion 6 of said stop member. When so disposed, it will be seen that the member 2 can not be moved longitudinally of the shank and in order to retain said member 2 against rotation on the shank, a pair of locking or retaining plates 7 of elongated design are pivoted, as shown at 8 on the outer face of the wall 3. These plates 7 are each pivoted on one side of the stop opening 4 and when swung in one direction, are adapted to contact with the sides of the stop member 5 which, it will be understood, has been disposed to a position as shown in Figs. 2 and 3, of the drawing. Pivoted in a bearing 9 on one of said locking or retaining plates 7, is a linking member 10 which is of the closed-loop design having one arm thereof convexed, as shown at 11 to pass around the front face of the stop member 5. The free end of this linking member is adapted to be engaged with a clip or the like 12 formed on the free end of the other of said retaining plates 7 and when so disposed, it will be seen that the retaining plates 7 will be tightly clamped on each side of the member 5, whereby to prevent the rotary movement of said member 2 on the shank. Thus said member 2 is incapable of rotary or longitudinal movement on the shank and the free end of the shank which is designed to form a handle member is disposed within said member 2 to be grasped by the hand of the cook in use. It is obvious from this description that the member 2 which is securely, but removably, held on the shank, will act as a shield to the hand and arm of the cook when using the utensil, having such a device applied thereon.

From the foregoing it will be seen that I have provided a simple and efficient means for carrying out the objects of the invention and while I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

1. The combination with the shank of a utensil having a slotted stop member formed thereon; of a frusto-conical shield provided with a wall at the smaller end thereof having an opening therein, said opening permitting the slotted stop member to be engaged with the wall of said shield, to secure the one against longitudinal movement with respect to the other, and means in connection with said wall adapted for coöperation with said stop member to prevent rotary movement of said shield on the shank.

2. The combination with the shank of a utensil having a slotted stop member carried thereon; of a frusto-conical shield having a wall at the smaller end thereof provided with an elongated opening, said opening permitting said slotted stop member to engage the wall of said shield to secure the shield against longitudinal movement on the shank, pivoted retaining plates carried on said wall adapted to be brought into contact with the sides of said stop member to prevent the rotary movement of said shield on the shank, and means to lock said pivoted retaining plates together in their effective positions.

3. The combination with the shank of a utensil having an elongated stop member carried thereon, said stop member being slotted from opposite ends to provide sections and having one section of slightly greater length than the other; of a frusto-conical shield having a wall at the smaller end thereof, said wall being provided with an elongated opening adapted to receive said shank and the shorter section of said stop member therethrough, whereby when said shank is turned, the wall of said shield will be received in the slotted portions of said stop member and secure the shield against longitudinal movement on the shank, a pair of pivoted retaining plates carried on the outer face of the wall of said shield adapted for engagement with the sides of said stop member when the latter has been disposed to its effective position, whereby to prevent radial movement of the shield on the shank, and means to lock said retaining plates together in their effective positions.

4. A device of the class described comprising a frusto-conical shield provided with a wall at the smaller end thereof, said wall having an elongated opening therein, a pair of plates pivoted at their ends on one side of said opening, and a linking member carried on the free end of one of said plates adapted to be engaged with the free end of the other of said plates.

In testimony whereof I hereunto affix my signature in the presence of two witnesses.

JAMES E. TAGGART.

Witnesses:
W. G. POOLE,
FRED H. HELFRICH.

---

Copies of this patent may be obtained for five cents each, by addressing the "Commissioner of Patents, Washington, D. C."